Figure 1:
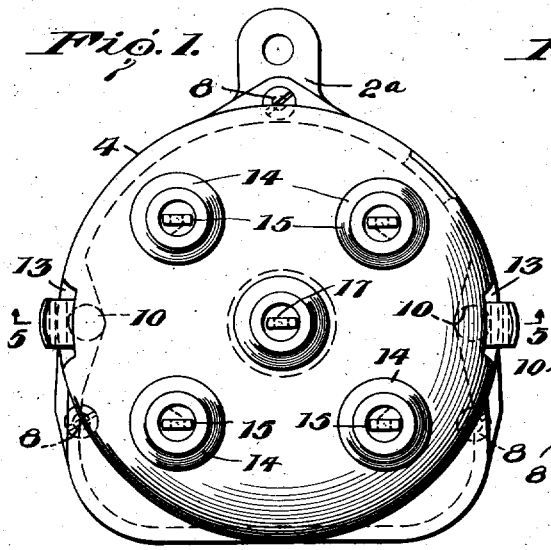

April 6, 1926. Re. 16,313

A. A. KENT

ELECTRIC IGNITING MECHANISM FOR INTERNAL COMBUSTION ENGINES

Original Filed April 9, 1917 2 Sheets-Sheet 1

Witness:-
Nellie Field
Helen R. Cassidy

Inventor
Arthur Atwater Kent

By Cornelius L. Ehret
his Attorney

April 6, 1926. Re. 16,313

A. A. KENT

ELECTRIC IGNITING MECHANISM FOR INTERNAL COMBUSTION ENGINES

Original Filed April 9, 1917 2 Sheets-Sheet 2

Inventor

Arthur Atwater Kent,

Witness:-
Nellie Field
Helen R. Cassidy.

By Cornelius D. Ehret
his Attorney

Reissued Apr. 6, 1926. Re. 16,313

UNITED STATES PATENT OFFICE.

ARTHUR ATWATER KENT, OF ARDMORE, PENNSYLVANIA.

ELECTRIC IGNITING MECHANISM FOR INTERNAL-COMBUSTION ENGINES.

Original No. 1,341,136, dated May 25, 1920, Serial No. 160,651, filed April 9, 1917. Application for reissue filed July 27, 1921. Serial No. 488,007.

*To all whom it may concern:*

Be it known that I, ARTHUR ATWATER KENT, a citizen of the United States, and a resident of Ardmore, Montgomery County, State of Pennsylvania, have invented certain new and useful Improvements in Electric Igniting Mechanisms for Internal-Combustion Engines, of which the following is a specification.

My invention relates to apparatus for controlling the production of electric sparks for igniting combustible charges in the cylinders of internal combustion engines.

An object of the present invention is to provide a mechanism which will automatically vary the time at which the spark is produced substantially proportionally to variations in the speed of the engine.

My improved device consists of a combined contact maker, distributer and speed responsive or spark controlling device, all arranged within a casing in a simple and compact manner, the speed responsive device being operable to advance the cam, which operates the contact device, and at the same time to also advance the arm of the distributer by means of which the various cylinders are consecutively put into series with the secondary winding of the induction coil, the primary winding of which is closed and opened very rapidly by the contact device.

In my prior Patent No. 1,192,788, dated July 25, 1916, is illustrated one form of an automatic device for performing generally the functions above indicated, and my present invention relates to certain improvements therein whereby the device is simplified, the construction is rendered very much more compact, and the work of assembling is simplified with a consequent reduction in the cost of manufacture.

Another object of my invention is to so construct the speed responsive device that the weights of the parts acted upon by centrifugal force may be materially reduced and the action thereof may be made more sensitive. Another object of my invention is to make the cam, which operates the contact device, substantially a part of the speed responsive device rather than one which is operated by a speed responsive device through the intermediary of some connection.

Another object of my invention is to make the whole mechanism much more nearly balanced to thereby avoid vibration in the mechanism when the parts are being driven at a rapid speed. A further object of my invention is to dispense with any bearing of the contact maker cam in the base upon which the contact maker is supported, said cam being mounted and supported on the driving shaft.

A further object of my invention is to provide a construction in which the main shaft is mounted in a single bearing extending to a point very near the contact device cam, and in which the main shaft itself substantially supports the speed responsive device, the cam for the contact maker, and the distributer arm of the distributing mechanism.

Other objects of my invention will appear in the specification and claims below.

Figure 2:
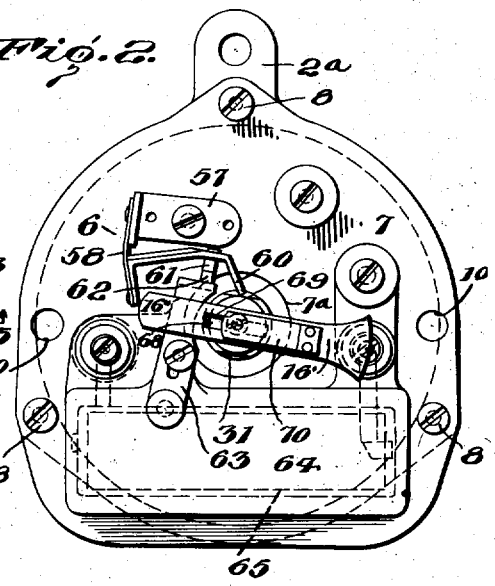
Figure 3:
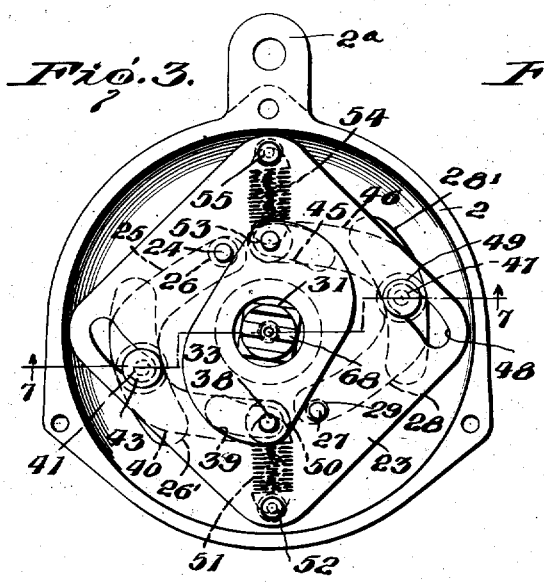
Figure 4:
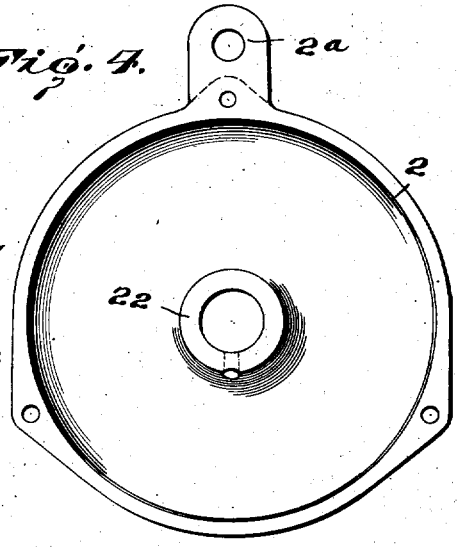

Referring to the drawings forming a part of this specification and in which the same reference numerals are employed throughout the various views to designate the same parts, Figure 1 is a plan view of the top of the mechanism; Fig. 2 is a plan view of the same with the cap in which the distributer contact points are mounted, removed to expose the contact maker; Fig. 3 is a plan view of the mechanism with the distributer arm and the base of the contact maker, together with the parts attached thereto, removed and disclosing a plan view of the speed responsive device or controlling mechanism; Fig. 4 is a plan view of the bottom part of the casing with the controlling mechanism and driving shaft removed.

Figure 5:
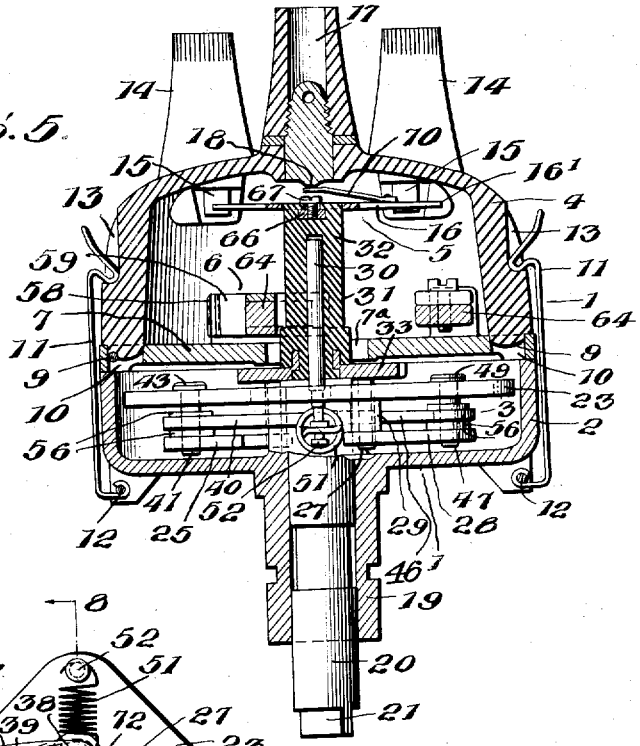
Figure 6:
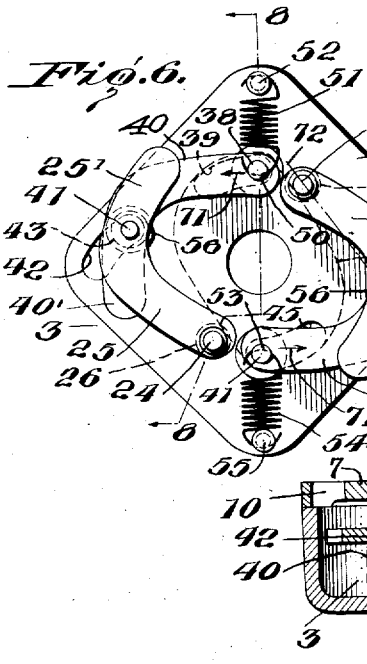
Figure 8:
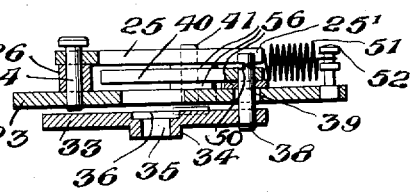
Figure 7:
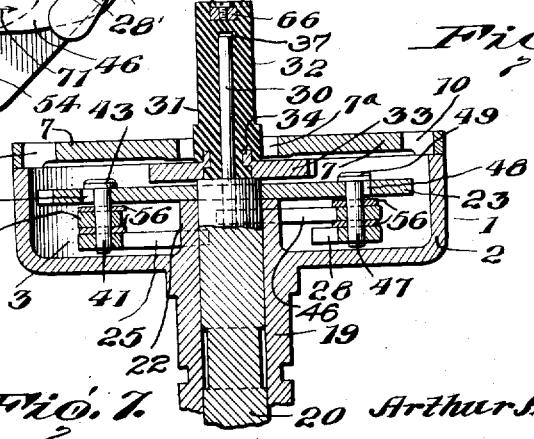

Fig. 5 is a vertical sectional view on the line 5—5 of Fig. 1, the speed responsive mechanism or governing mechanism being not sectioned but shown in side elevation; Fig. 6 is an inverted or bottom view of the controlling mechanism showing the positions of the weights and springs when the driving shaft is stationary; Fig. 7 is a vertical sectional view through the lower portion of the casing and through the governing mechanism, same being taken on the line 7—7 of Fig. 3, the top of the main portion of the driving shaft, however, being not sectioned; and Fig. 8 is a transverse sectional view of the governor or speed responsive mechanism taken on the line 8—8 of Fig. 6.

The mechanism forming the subject matter of this invention is inclosed within a casing 1, which casing comprises two parts, a cup-shaped portion 2, preferably of metal, and by which is inclosed the speed responsive or spark controlling mechanism 3, and a cap 4, preferably of insulating material, in which is embedded the distributer terminals 15 of the secondary circuit of the distributing mechanism 5. This cap 4 covers and incloses the contact maker 6 and the distributer mechanism 5. The contact maker is preferably mounted upon a metallic base or plate 7, secured by screws 8—8—8 to the top of the cup-shaped portion 2, and the cap 4 is preferably seated on the top of the base plate 7 and positioned with respect thereto by lugs 9—9 molded on the bottom edge of the cap 4 and adapted to register with the corresponding openings 10—10 in the base plate 7. For holding the cap 4 fixedly to but readily removable from the base plate 7, and the cup-shaped portion 2, I preferably provide a pair of spring clips 11—11 pivoted on suitable pivot pins 12—12 on opposite sides of the cup shaped portion 2 of the casing, the upper ends of said spring clips 11 being bent to form spring hooks adapted to snap into recesses 13—13 provided therefor on opposite sides of the cap or cover 4. The cap 4 is preferably provided with a convex top surface from which extend four hollow projections 14 equi-distant from the center or axis of the cap 4 and equi-distant from each other, each being adapted to fit over and hold respectively one of the leads of the secondary circuit extending each respectively to a cylinder of an internal combustion engine. These leads passing through the projection 14 are respectively connected with the terminal and contact points or plates 15 embedded in the cap 4 and arranged to cooperate with the distributer arm 16 of the distributing mechanism 5. At the center of the cap 4, and projecting vertically therefrom, is a fifth hollow projection 17 adapted to fit over the lead which extends to the secondary winding of the induction coil, and which affords communication with the central terminal and contact point or plate 18 of the distributer mechanism also embedded in the cap 4 as clearly appears in Fig. 5.

The cup-shaped portion 2 of the casing 1 is preferably provided with a centrally arranged outwardly projecting hub 19, by means of which the whole device may be suitably mounted and supported for rotation by actuation of lug 2[a] for manual advance or retardation of the ignition. In hub 19 is suitably journaled the driving shaft 20 provided at its lower end with a clutch or coupling 21, by means of which it may be attached to a shaft of an internal combustion engine.

Within the cup-shaped portion 2 of the casing and extending upwardly from the bottom thereof and in an axial alignment with the shaft 20 and hub 19 is a lug or projection 22, extending well toward the top of the cup-shaped portion 2 and in it the shaft 20 smoothly fits. This lug or projection 22 forms in fact a continuation of the hub 19, but within the casing, and with the hub or projection 19 provides the journal for the shaft 20, and extends to substantially the top of the main portion of the driving shaft 20. Near the top of the main portion of the driving shaft 20 a plate 23 is rigidly united with the shaft 20, the plate 23 being preferably substantially square. This plate 23 forms the support for and is a part of the speed responsive mechanism 3. This plate 23 rests on the top of the lug or projection 22, the upper end of the lug 22 forming the thrust or step bearing upon which the shaft 20 of the speed responsive mechanism 3 is supported.

Depending from the plate 23 is a pivotal stud 24 forming a pivot pin to which one end of a substantially L-shaped weight 25 is attached. The said weight 25 is, however, spaced from the plate 23 by a collar or washer 26.

On the diametrically opposite side of the plate 23 (with respect to the axis of the shaft 20) is a similar depending stud 27 forming a pivotal support for a similar substantially L-shaped weight 28, said weight being similarly spaced from the plate 23 by a similar collar or washer 29. These weights 25 and 28 are exactly alike but the laterally extending portions 25′ and 28′ thereof extend in opposite directions on opposite sides of the axis of the shaft 20, and said portions 25′ and 28′ are slightly curved to approximate substantially the arc of a circle whose center is the axis of the shaft 20.

Above the plate 23 the shaft 20 is substantially reduced in diameter to form an extension 30 integral with said shaft 20 and forming a support or bearing for the combined contact maker or cam 31, distributer arm support 32 and upper plate 33 of the speed responsive device 3. The contact maker cam 31 and distributer arm support 32 are preferably made of suitable molded insulating material, such as bakelite, and is molded directly on to and made unitary with the upper plate 33 of the governing mechanism or speed responsive device 3. This upper plate 33 is clearly shown in Fig. 3, and is indicated in dotted lines in Fig. 6. Sections of it are also shown in Figs. 5, 7 and 8. This plate 33 is preferably punched from sheet metal and is provided with a circular hub 34 struck up out of the metal itself, as plainly shown in Figs. 7 and 8, said hub or annular projection 34 having an aperture 35 through the hub thus formed and projecting above the top surface of the plate 33. The plate 33 is so provided with a larger circular recess 36 concentric with the aperture 35 below the smooth or bottom side thereof. The combined bakelite cam 31 and distributer arm 32 are molded into, over and around the hole 35, recess 36 and projection or hub 34 which form a considerable surface on the plate 33 and in this way the same are rigidly united and anchored to the plate 33, as clearly shown in Fig. 7. This molded cam 31 and distributer support 32 has also molded in it at the same time an axial hole or opening 37 to smoothly fit over the reduced extension 30 of the shaft 20. The hole 37 is preferably deeper than the length of the said reduced extension 30, so that when the unitary contact maker cam 31 distributer arm support 32 and upper plate 33 of the governor mechanism are slipped over the reduced extension 30 the plate 33 bears against the shoulder between the main portion of the shaft 20 and the reduced extension 30 and is thus supported by the shaft 20 in axial alinement therewith.

The upper plate 33 is provided with a depending stud 38 passing through an arc-shaped slot 39 in the bottom plate 23, the center of said arc-shaped slot being the axis of the shaft 20 and this stud 38 forms a pivot for a substantially L-shaped weight 40, like the weights 25 and 28, having a laterally extending portion 40′ overlying or overlapping the corresponding portion 25′ of the weight 25. The weights 25 and 40 are pivoted together on a stud 41 riveted to the weight 25 and extending freely through the weight 40 and through an arc-shaped slot 42 in the bottom plate 23, the center of said arc-shaped slot 42 being the axis of the stud 24. This stud 41 is provided with a head 43 on the upper surface of the bottom plate 23 the diameter of said head being greater than the width of said slot 42.

On the diametrically opposite side of the top plate 33 and at the same distance from the axis of the shaft 20 that the axis of the stud 38 is, is riveted a depending stud 44 passing through the plate 33 through an arc-shaped slot 45, the center of curvature of which is the axis of the shaft 20, and passing below the bottom plate 23, forms a pivot for a fourth substantially L-shaped weight 46 like the weights above described, but whose laterally extending portion 46′ overlies or overlaps the laterally extending portion 28′ of the weight 28. The weights 40 and 46 are between the weights 25 and 28, respectively, and the bottom plate 23. The overlapping portions 46′ and 28′ of the weights 46 and 28 are pivoted together by a stud 47, riveted to the weight 28, which stud 47 passes freely through a circular opening in the weight 46 and thence through an arc-shaped slot 48 in the bottom plate 23. The center of said arc-shaped slot 48 is the axis of the stud 27 and this stud 47 is provided with a head 49 on the top of the bottom plate 23 of larger diameter than the width of the slot 48.

The depending stud 38 passes freely through the L-shaped weight 40 and below it is provided with a kerf 50 on the side thereof adjacent the shaft 20, and into it one end of a coil spring 51 is hooked, the other end of said spring 51 being attached to a stud 52 depending from the under side of the plate 23 (see Fig. 8). The other depending stud 44 also passes freely through the weight 46 and is provided with a similar kerf 53 into which is hooked one end of the coil spring 54, the other end of which is attached to a stud 55 depending from the side of the plate 23 and diametrically opposite the said stud 52. In their normal positions, that is to say, when the shaft 20 is stationary, these coiled springs 51 and 54 are in axial alinement with each other and their longitudinal axes pass through the axis of the shaft 20.

The four weights above described are all loosely mounted at all their respective points of pivotal connection to the plates 23 and 33 and to each other, as above described, and the studs pass freely through their respective arc-shaped slots in the plate 23; between the weights 25 and 40 and between the weight 40 and the plate 23 are thin spacing washers 56, and similarly between the weights 28 and 46 and between the weight 46 and the plate 23 are like thin spacing washers 56 so that these weights do not bear against each other nor against the plate 23.

A similar thin washer 56 is placed on the stud 38 between the weight 40 and the bottom plate 23; and also one on the stud 44 between the weight 46 and the bottom plate 23. These washers thus greatly diminish friction, keep the weights out of substantial rubbing or sliding engagement with the plate 23 and each other, reducing the liability of their sticking, reducing friction, and rendering them sensitive. The relatively loose pivoting of the weights to their studs and to each other also contributes to the same end.

It will be observed that the said weights are all on the under side of the bottom plate 23 surrounding the lug or projection 22, that is to say, that the bearing for the shaft 20 extends within the weights and up to and against the bottom plate 23 of the speed responsive device. This disposition of the parts supports the weights below the top of the shaft 20 and below the top of the bearing for the shaft 20, thus reducing very materially the distance which said bearing extends below the bottom of the cup-shaped portion 2; reducing the height of the cup-shaped portion 2 of the casing; and firmly supporting the shaft in a bearing extending up to a point adjacent the operative portion of the contact maker cam 31. This construction also makes it possible to support the contact maker cam and distributer arm support substantially directly upon the shaft 20 dispensing with any bearing therefor in the base plate 7 of the contact device, thus further reducing cost of manufacturing.

Above the base plate 7 of the contact device and upon the top surface thereof is supported the contact device or contact maker 6. This contact maker comprises a bracket 57, attached to the base plate 7 and adjustable thereon, to an up-turned end of which is secured a leaf spring 58, on the other end of which is attached a movable contact carrying arm 59, the free end of which is provided with a cam-engaging tip 60, preferably of hard smooth steel or similar material. On this arm 59 is carried a platinum or tungsten movable interrupter or timer contact 61 adapted to cooperate with a stationary interrupter or timer contact 62 mounted on a bracket 63 longitudinally adjustable on a condenser plate or cover 64 which is insulated in any suitable manner from the base plate 7. Normally the contacts 61 and 62 are in engagement but as the contact maker cam 61 is revolved the high parts of the said cam intermittently lift the movable contact 61 out of engagement with the stationary contact 62. During the period when the low parts of the cam 31 are passing under the tip 60 of the arm 59 the spring 58 returns the movable contact into engagement with the stationary contact to close a circuit of the ignition system.

Between the base 7 and the cover 64 is clamped in any suitable manner a condenser 65 bridging the contacts 62 and 63.

Above the cam 31 extends the distributer arm support 32 into the upper end of which is embedded a metal bushing 66 which is threaded to receive a set screw 67; the upper end of the distributer arm support is also preferably provided with molded lugs 68 adapted to pass through a slot 69 in the metal distributing arm or block 16, said set screw 67 serving to rigidly hold said distributer arm or block on to the top of the distributer support, and said arm because of slot 69 being slightly longitudinally adjustable on said support to permit the end 16′ to be brought into suitable electrical cooperation with the terminals or plates 15. The other end 16″ of the distributer projects on the opposite side thereof sufficiently to substantially counterbalance the end 16′. To the top of the distributer arm 16 is riveted a leaf spring 70 adapted to engage with the central contact point or plate 18 of the distributer.

The centrifugal force, developed in the weights 25, 28, 40 and 46 by the rotation of the shaft 20, acts to throw the weights outwardly radially from the axis of the shaft to a position where this force is balanced by the springs 51 and 54. The springs 51 and 54 being normally in the position shown in Fig. 6, the first movement of the pivot pins or studs 38 and 44 is substantially at right angles to the axis of said springs, as indicated by the arrows 71, Fig. 6, and such first movement is only slightly resisted by the springs. A considerable movement of said pins from this position operates to turn said springs about their studs 52 and 55 without stretching the springs to a great extent. As the studs 38 and 44 continue to move about the axis of the shaft 20 and in their slots 39 and 45, under an increased centrifugal force due to increased speed of the shaft 20, the direction of their motion more nearly approaches one axially of the springs; that is to say, they stretch the springs more and turn them less about their pivot pins or studs 52 and 55. The resistance of the springs to the motion of the studs 38 and 44 therefore rapidly increases as the movement or displacement increases, and this resistance I have found to be substantially proportional to variations in the centrifugal force developed in the weights at such varying speeds. As a result of this the amount of angular movement of the top plate 33 with respect to the bottom plate 23 is substantially directly proportional to variations in speed of the shaft 20.

The ends of the springs 51 and 54 which are respectively seated in the kerfs 50 and 53, serve to retain the weights 40 and 46 on their pivotal studs 38 and 44 without other securing means. These springs resist the advance of the plate 33 by the centrifugal force developed by the rotation of the weights about the shaft 20 and also serve to prevent the said weights 40 and 46 from slipping off their pivot pins respectively.

By making the cam 31, distributer arm support 32 with the positioning lugs 68 and plate 33 unitary there can be no angular displacement of these parts with respect to each other, and these units may be made in great numbers exactly alike, and all assembling and adjusting of said three parts is absolutely eliminated. Moreover, if for any reason that part requires to be replaced in an old machine, it is only necessary to remove the cap 4, remove the plate 7 and draw the entire speed responsive mechanism as a unit, with the shaft 20, from the cap 2. The ends of the springs 51 and 54 may be then released from the kerfs 50 and 53 and the combined cam, distributer support and top plate with the studs 38 and 44 may be drawn out of the other parts and off of the extension 30, and a new one as readily put back in place, without in any manner disturbing the adjustment of the timer or distributer, or disturbing the adjustment of the speed responsive mechanism thereto.

The cam structure extends from shaft 20 upwardly through the aperture 7[a] in member 7 without bearing or support on member 7.

It will be seen that each weight or governing member is loosely held or supported and at two points only, namely, at the pivotal point at one end of each governing member and at the pivotal point where two cooperating members are pivoted together. To prevent these members from tipping on these pivotal points the holes for the pivotal pins through each member are so disposed that the weight of each member on one side of a line drawn through these pivotal points is balanced. As indicated in Fig. 6 the weight of the member on one side of the dot and dash line 72—72 balances the weight of that part of the other side of said line.

The weight of each governing member is thus balanced on each side of the line passing through the two points at which each weight is pivoted. This feature of construction makes it possible to loosely pivot the members 22, 25, 40 and 46 together as above described and at the same time avoids any tendency of the members to turn about the lines, connecting their pivotal points, as axes. It also prevents any binding or cramping of the members on their pivots and reduces the friction between the members, or between the members and the plate, as they move or slide over each other and over the plate 23. This construction renders the governing members very sensitive and responsive to variations in the speed of the drive shaft.

It is, of course, to be understood that the number of cam faces and of leads of the secondary circuit will vary with different engines to correspond with the number of cylinders.

What I claim is:

1. In a spark forming and controlling device the combination of a casing, a driving shaft, a journal for said drive shaft in said casing and extending upwardly into said casing and forming a step or thrust bearing, a plate rigidly secured to said shaft and resting on said step bearing, a second plate, a combined cam and distributer arm support rigidly secured to said second plate and mounted and supported on the top end of said shaft and rotatable with respect to said shaft and means operatively attached to said plates and located below said first mentioned plate to vary the angular position of said top plate and the parts carried thereby with respect to said drive shaft.

2. In a spark forming and controlling device the combination of a cup-shaped casing, a driving shaft, a journal for said drive shaft in said casing, and extending upwardly in said casing and forming a step or thrust bearing, a plate rigidly secured to said shaft and supported on said thrust bearing, a second plate loosely journaled on said shaft above said first mentioned plate, means operatively attached to said plates and located below said first mentioned plate and surrounding said journal to vary the angular position of said top plate with respect to said shaft proportionally to variations in the speed of said drive shaft, and to drive said second mentioned plate from said drive shaft, and a contact maker cam and distributer arm support of insulating material unitarily united to and supported by said second mentioned plate.

3. In a spark forming and controlling device the combination of a cup-shaped casing, a driving shaft, a journal for said drive shaft in said casing, and extending upwardly in said casing and forming a step or thrust bearing, a plate rigidly secured to said shaft and supported on said thrust bearing, a second plate loosely journaled on said shaft above said first mentioned plate, means operatively attached to said plates and located below said first mentioned plate and surrounding said journal to vary the angular position of said top plate with respect to said shaft proportionally to variations in the speed of said drive shaft, and to drive said second mentioned plate from said drive shaft, and a combined contact maker cam and distributer arm support of bakelite mounted on said second mentioned plate and supported thereby and unitarily molded thereto.

4. In a spark forming and controlling device the combination of a drive shaft comprising a main portion and a reduced upper end, a plate, a combined cam and distributer arm support of insulating material united by molding to said plate and provided with an axial bore fitting over the reduced end of said shaft, a plate secured to said drive shaft adjacent the shoulder between the main portion and the reduced portion of said shaft, a weight pivoted at one end to said first mentioned plate, a weight pivoted at one end to said second mentioned plate, means to pivot the free ends of said weights together, said weights being below said plate on said main portion of said shaft, a journal for said drive shaft extending to said plate on said drive shaft and forming a stop or thrust bearing for said plate on said main portion whereby said plates, weights and parts carried thereby are all mounted on said shaft and supported on said thrust bearing.

5. In a spark forming and controlling device the combination with a drive shaft comprising a main portion and a reduced upper end, providing a shoulder between them, a plate, a combined cam and distributer arm support of insulating material unitarily united by molding to said plate and provided with an axial bore fitting over the reduced end of said shaft and supported on said shoulder, a plate secured to said drive shaft adjacent said shoulder, and a pair of L-shaped weights having their ends loosely pivoted, respectively, to said plates and located below said plate on said drive shaft, and having their free ends overlapping and loosely pivoted together and a journal for said drive shaft extending to said plate on said drive shaft and forming a thrust bearing therefor.

6. In a spark forming and controlling device the combination of a drive shaft, a top plate, a bottom plate, a weight below said bottom plate pivoted at one end to said top plate on a pivot extending through said bottom plate, a weight below said bottom plate pivoted at one end to said bottom plate, pivotal means connecting the free ends of said weights, a complemental pair of similar weights similarly pivoted, respectively, to the top and bottom plates and to each other and symmetrically disposed with respect to said first mentioned pair of weights, and yielding means tending to hold said plates in a fixed and angular relation with respect to each other and yielding under the action of centrifugal force in said weights to counterbalance said centrifugal force and to regulate the amount of angular movement of said top plate with respect to said bottom plate.

7. In a spark forming and controlling device the combination of a top plate, a bottom plate, a pair of substantially L-shaped weights pivoted at one end to said top plate and said bottom plate, respectively, and having their free ends pivoted together, said weights being disposed below said bottom plate, and being disposed on one side of a line passing through the axis of said shaft, a similar pair of similar weights similarly pivoted, respectively, to said top and bottom plates and to each other and symmetrically disposed below said bottom plate on the opposite side of said line, a drive shaft to which said bottom plate is rigidly secured, a journal for said drive shaft forming a thrust bearing upon which said bottom plate is supported and rotated, and a contact maker cam mounted upon said top plate in axial alinement with said shaft.

8. In a spark forming and controlling device the combination of a top plate, a bottom plate, a pair of substantially L-shaped weights pivoted at one end to said top plate and said bottom plate, respectively, and having their free ends pivoted together, said weights being disposed below said bottom plate, and being disposed on one side of a line passing through the axis of said shaft, a similar pair of similar weights similarly pivoted respectively, to said top and bottom plates and to each other and symmetrically disposed below said bottom plate on the opposite side of said line, a drive shaft to which said bottom plate is rigidly secured, a journal for said drive shaft forming a thrust bearing upon which said bottom plate is supported and rotates, and a combined contact maker cam and distributer arm support of insulating material unitarily united to said top plate and supported by said shaft.

9. In a spark forming and controlling device the combination of a drive shaft having a reduced upper end forming a shoulder, a combined cam and distributer arm support journalled on said reduced end, a top plate rigidly secured to said combined cam and distributer arm support and bearing against said shoulder, a bottom plate rigidly secured to said shaft adjacent said shoulder, a weight below said bottom plate pivoted at one end to said bottom plate, a second weight below said bottom plate and pivoted at one end to said top plate on a pivot extending freely through said bottom plate, pivotal means connecting the free ends of said weights together, a journal for said shaft having an upper end forming a thrust or step bearing upon which said bottom plate bears and a spring tending to hold said plates in a fixed relation with respect to each other and yieldingly resisting the pull of centrifugal force developed in said weights.

10. In a spark forming and controlling device the combination of a drive shaft, a plate having a center hole or opening and an annular flange extending on one side of said plate co-axially with said opening, said plate being provided with a recess in its opposite side larger than and co-axially with said flange, a combined cam and a distributer arm support of insulating material molded on, over and around said flange and into said hole and recess, and provided with an axial bore into which said upper end of said shaft smoothly fits, a spark advancing and retarding mechanism operatively connecting said driving shaft and said plate, a contact device operated by said cam, a distributer arm secured to the top of said support and a series of contact plates cooperating with said distributer arm.

11. In a spark forming and controlling device the combination of a drive shaft, a plate having a central hole or opening and an annular flange extending on one side of said plate co-axially with said opening and provided with a recess on the other side thereof larger than and coaxially with said opening through said flange and a combined cam and distributer arm support of insulating material molded on, over and around said flange and into said hole and recess and provided with an axial bore into which the upper end of said shaft smoothly fits, a spark advancing and retarding mechanism operatively connecting said plate and said drive shaft, a contact device operated by said cam, a metallic distributer arm secured to the top of said support and extending transversely on both sides of the axis of said support, a circular series of contact points, one end of said distributer arm being arranged to cooperate with said contact points, and the other end of said arm forming a substantial counterbalance for that end of said arm which cooperates with said contact points.

12. In a spark forming and controlling device the combination of a hollow cup-like casing, the base plate of a contact maker secured to the top of said casing, a driving shaft provided with an extension passing through said base plate, a contact maker operating cam journaled on said extension, a contact maker operated thereby and mounted on said base plate and a cam advancing and retarding mechanism operated by centrifugal force and operatively connecting said cam and drive shaft, said mechanism comprising a plate operatively connected to said cam, a plate rigidly secured to said drive shaft, a weight pivoted at one end on said first mentioned plate on a pivot passing through said plate on said drive shaft, a weight pivoted to said second mentioned plate and having its free end pivoted to the free end of said first mentioned weight, said weights being below said plates and within said cup-shaped casing, a spring tending to hold said plates in a predetermined position and operating to counterbalance the centrifugal force developed in said weights, and the distributer arm rigidly secured to said shaft and rotated therewith and transversely adjustable thereon.

13. In a spark forming and controlling device the combination of a drive shaft, a governing mechanism driven by said drive shaft, and including a plate driven by said shaft through said governing mechanism and angularly advanced and retarded by said governing mechanism, said plate being provided with an annular flange projecting from one side thereof and with an annular recess co-axial with the opening through said flange and located on the other side of said plate and a combined contact maker cam and distributer arm support of bakelite molded on said plate unitarily therewith over, around, and into said recess on the opposite side of said plate.

14. In a spark forming and controlling device the combination of a drive shaft, a plate secured to said shaft. a second plate mounted to turn independent of said shaft on an axis in substantial alinement with the axis of said shaft and a pair of substantially L-shaped weights or governing members on the same side of both of said plates, each member having one of its ends loosely pivoted to one of said plates respectively, said members having their free ends respectively overlapping and disposed in parallel planes, and a pivotal connection loosely pivoting same together intermediate of their ends, the weight of each member being balanced on each side of a line drawn through the pivotal points thereof.

15. The combination with ignition timing cam, of a governor member secured thereto, a driving shaft, a second governor member secured thereto at the end thereof, weights movable under the influence of centrifugal force for angularly adjusting said governor members with respect to each other, said first named governor member disposed adjacent the end of said shaft on one side of said second governor member, and all the governor weights disposed on the opposite side of said second governor member.

16. The combination with ignition timing cam, of a governor member secured thereto, a driving shaft, a second governor member secured thereto, weights movable under the influence of centrifugal force for angularly adjusting said governor members with respect to each other, all of the governor weights disposed on one side of that governor member which is secured to said shaft, and the other governor member disposed on the opposite side of said governor member which is secured to said shaft.

17. The combination with ignition timing structure, as a cam, of a governor member secured thereto, a driving shaft, a second governor member secured thereto, and a pair of governor weights pivoted, respectively, to said governor members and both disposed on one side of one of said governor members, the other governor member disposed on the opposite side of said one of said governor members, said one of said governor members having a slot through which extends the pivot on which one of said weights is pivoted to said other governor member.

18. The combination with ignition timing structure, as a cam, of a governor member secured thereto, a driving shaft, a second governor member secured thereto, a pair of governor weights pivoted, respectively, to said governor members and both disposed on one side of one of said governor members, the other governor member disposed on the opposite side of said one of said governor members, said one of said governor members having a slot through which extends the pivot on which one of said weights is pivoted to said other governor member, and a pivot on which said weights are pivoted to each other, said one of said governor members having a slot in which said last named pivot is movable.

19. The combination with ignition timing structure, as a cam, of a governor member secured thereto, a driving shaft, a second governor member secured thereto, a pair of weights pivoted to each other upon a pivot movable in a slot in one of said governor members, said weights disposed upon one side of said one of said governor members, and the other governor member disposed on the opposite side of said one of said governor members.

20. Ignition controlling apparatus comprising a casing, a cover member closing said casing and secured thereon at the end thereof, said cover member having an aperture, a driving shaft extending into said casing and terminating short of said cover member, a cam member having a bearing on said shaft only and driven by said shaft and extending freely through said aperture, and ignition controlling contacts disposed upon the outer side of said cover member and controlled by said cam member.

21. Ignition controlling apparatus comprising a casing, a cover member closing said casing, said cover member having an aperture, a driving shaft extending into said casing and terminating short of said cover member, a cam member surmounting and rotatable with respect to said shaft and having a bearing on said shaft only and extending freely through said aperture, a governor in said casing connecting said shaft with said cam member, and ignition controlling contacts disposed upon the outer side of said cover member and controlled by said cam member.

22. Ignition controlling apparatus comprising a driving shaft, ignition controlling contacts, a cam member for controlling said contacts, an axial extension on said shaft, said cam member having an axial bore receiving said extension, a governor plate on said cam member adjacent the end of said shaft, a second governor plate secured to said shaft adjacent the end thereof, and weights for angularly adjusting said governor plates with respect to each other.

23. Ignition controlling apparatus comprising a driving shaft, a hub forming a bearing therefor, a governor plate secured to the end of said shaft and disposed at the end of said hub, an extension on said shaft beyond said plate and hub, a cam member having a bore receiving said extension, a second governor plate secured to said cam member, weights for angularly adjusting said governor plates with respect to each other, and ignition controlling contacts controlled by said cam member.

24. Ignition controlling apparatus comprising a driving shaft, a hub forming a bearing therefor, a governor plate secured to the end of said shaft and disposed at the end of said hub, a cam member, a second governor plate secured to said cam member, and governor weights for effecting angular adjustment of said governor plates with respect to each other, said weights disposed upon one side of said first governor member and surrounding said hub.

25. Ignition controlling apparatus comprising a casing, a hub terminating within said casing, a driving shaft having a bearing in said hub and terminating in said casing beyond the end of said hub, a governor plate secured to said shaft immediately adjacent said end of said hub, a cover for said casing having an aperture, a cam member extending freely through said aperture, a second governor plate secured to said cam member, weights for effecting angular adjustment of said governor plates with respect to each other, and ignition controlling contacts controlled by said cam and disposed upon said cover member.

26. Ignition controlling apparatus comprising a casing, a hub terminating within said casing, a driving shaft having a bearing in said hub and terminating in said casing beyond the end of said hub, a governor plate secured to said shaft immediately adjacent said end of said hub, a cover for said casing having an aperture, a cam member extending freely through said aperture, a second governor plate secured to said cam member, weights for effecting angular adjustment of said governor plates with respect to each other, ignition controlling contacts controlled by said cam and disposed upon said cover member, a cap having distributor terminals covering said cover member, and a distributor member of insulating material on said cam member disposed within said cap co-acting with said terminals.

27. Ignition controlling apparatus comprising a base member having an aperture, a driving shaft terminating short of said base in alignment with said aperture, ignition controlling contacts on the side of said base opposite said shaft, and cam structure for controlling said contacts having a bearing on said shaft only and extending freely through said aperture and abutting against the end of said shaft.

28. Ignition controlling apparatus comprising a base member having an aperture, a driving shaft terminating short of said base in alignment with said aperture, ignition controlling contacts on the side of said base opposite said shaft, an extension on said shaft, and cam structure having a bearing on said shaft only and extending freely through said aperture for controlling said contacts and having a bore receiving said extension.

29. Ignition controlling apparatus comprising a base member having an aperture, a driving shaft terminating short of said base in alignment with said aperture, ignition controlling contacts on the side of said base opposite said shaft, an extension on said shaft, and cam structure having a bearing on said shaft only and extending freely through said aperture for controlling said contacts and having a bore receiving said extension and abutting against the end of said shaft.

30. In ignition controlling apparatus, a cam and distributor support integral with each other and consisting of molded insulating material, and a conducting distributor arm secured to said support and extending to opposite sides of the axis of the rotation to form a substantially balanced structure.

31. In ignition controlling apparatus, a cam and distributor support integral with each other and consisting of molded insulating material, said support being substantially symmetrical about the axis of rotation, and a conducting distributor arm secured to said support and extending to opposite sides of the axis of rotation beyond said support and forming a substantially balanced structure.

32. In ignition controlling apparatus, a unit consisting of a governor member, a cam and distributor support, said cam and distributor support integral with each other and consisting of molded insulating material molded to said governor member.

33. In ignition controlling apparatus, a governor member, a cam member and distributor support of insulating material integral with each other and attached to said governor member, and a metallic distributor secured to the end of said support.

34. In ignition controlling apparatus, a cam member and distributor support of insulating material integral with each other, said support having lug structure at its end, a metallic distributor having a slot receiving said lug structure, and means securing said distributor to said support.

35. Ignition controlling apparatus comprising a driving shaft, a cam member, governor plates immediately adjacent each other side by side longitudinally of said shaft and secured to said shaft and cam member, respectively, one of said governor plates having an opening, a member on the other governor plate extending into said opening, and a spring connected at its opposite ends to said governor plates.

36. Ignition controlling apparatus comprising a driving shaft, a cam member, governor members secured to said shaft and cam member, respectively, one of said governor members having an opening, a pin on the other governor member extending into said opening, and a weight pivoted on said pin.

37. Ignition controlling apparatus comprising a driving shaft, a cam member, governor members lying immediately adjacent each other and secured, respectively, to said shaft and cam member, one of said members having an opening, a pin carried by the other of said members extending into said opening, a second pin carried by one of said members, a spring normally extending approximately radially from the axis of said shaft and connected at its opposite ends to said pins, and weight structure for moving said governor members with respect to each other.

38. Ignition controlling apparatus comprising a driving shaft, a cam member, governor members comprising plates secured, respectively, to said shaft and cam member and disposed immediately adjacent each other as regards their position longitudinally of the axis of said shaft, weight structure having plate form parallel to said governor plates for moving said governor plates with respect to each other, and a spring connected at its opposite ends to said governor plates.

39. Ignition controlling apparatus comprising a driving shaft, a cam member, governor members comprising plates secured, respectively, to said shaft and cam member and disposed immediately adjacent each other as regards their position longitudinally of the axis of said shaft, weight structure having plate form parallel to said governor plates for moving said governor plates with respect to each other, and a spring normally extending substantially radially to the axis of said shaft connected at its opposite ends to said governor plates.

In testimony whereof I have hereunto affixed my signature this 22nd day of July, 1921.

ARTHUR ATWATER KENT.